W. J. McKEE.
BULL-WHEELS FOR DERRICKS.

No. 194,162. Patented Aug. 14, 1877.

WITNESSES:

INVENTOR:
W. J. McKee.
BY
ATTORNEYS.

UNITED STATES PATENT OFFICE.

WILLIAM J. McKEE, OF PETROLIA, PENNSYLVANIA.

IMPROVEMENT IN BULL-WHEELS FOR DERRICKS.

Specification forming part of Letters Patent No. 194,162, dated August 14, 1877; application filed June 11, 1877.

*To all whom it may concern:*

Figure 1:
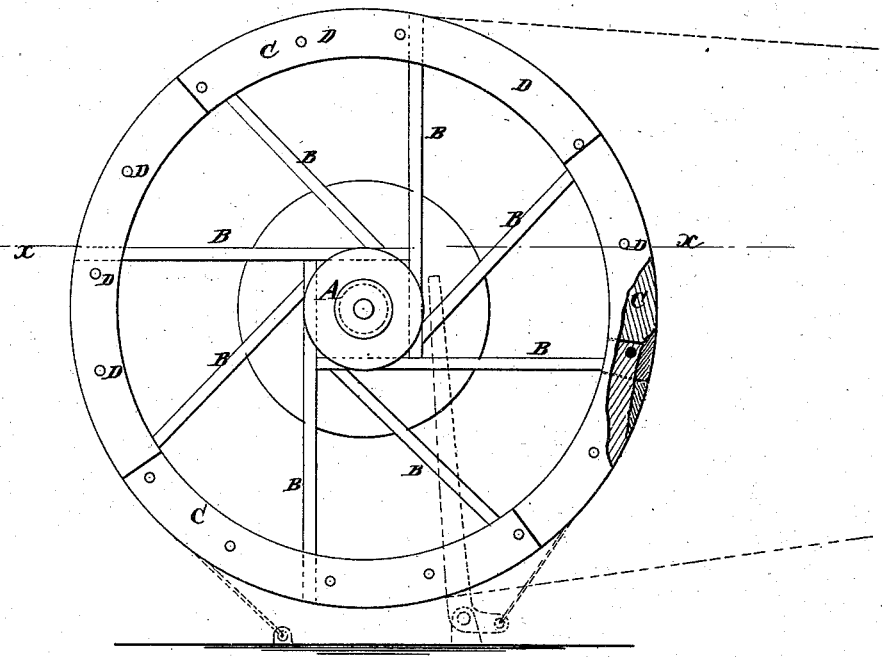
Figure 2:
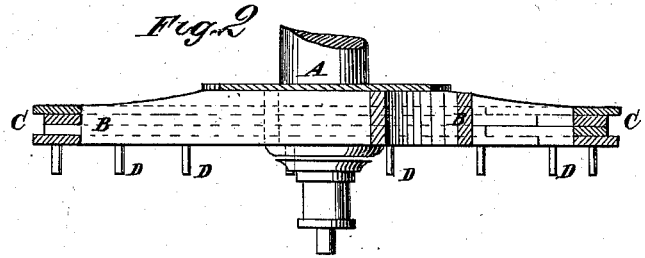
Figure 3:
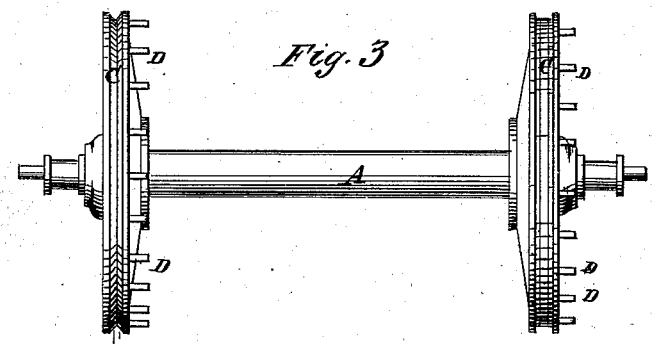

Be it known that I, WILLIAM J. MCKEE, of Petrolia, in the county of Butler and State of Pennsylvania, have invented a new and useful Improvement in Bull-Wheels for Derricks, of which the following is a specification:

Figure 1 is a side view of my improved wheel, part of the rim being broken away to show the construction. Fig. 2 is a cross-section of the same, taken through the line $x\ x$, Fig. 1. Fig. 3 is a front view of the same.

Similar letters of reference indicate corresponding parts.

The object of this invention is to furnish an improved bull-wheel which shall be stronger, and at the same time lighter, than wheels constructed in the usual way.

The invention will first be described in connection with the drawing, and then pointed out in the claim.

A represents the shaft of the bull-wheels, the journals of which revolve in bearings, in the usual way.

To the shaft A, near its ends, are attached the inner ends of the arms or spokes B of the two bull-wheels, to the outer ends of which are attached the rims C of said wheels. The rims C are built up of three, four, or more layers or thicknesses of segments of ring-plates arranged to break joints.

The outer ends of the arms or spokes B are notched and slotted, as shown at the left-hand side of Fig. 2, so that the segments of every other one of said layers may pass through the ends of the said arms or spokes, and the segments of every other layer may abut against said arms or spokes.

By this construction the strain will come right over, and will be distributed among, the arms or spokes of the wheel, and a lighter and stronger wheel will be produced.

The layers of the rims are held together, and the wheels are strengthened, by the pins D, the ends of which project to serve as handles for turning the wheels by hand. The face of one of the wheels B C is grooved to receive the drive or tug rope, and the other has a wide flat groove formed upon it to receive the brake strap or band.

Having thus described my invention, I claim as new and desire to secure by Letters Patent—

A bull-wheel for derricks, provided with a solid segmental rim alternately slotted in the arms thereof, and bringing the strain directly over and on the ends of the arms, as shown and described.

WILLIAM JOHN McKEE.

Witnesses:
M. J. JACK,
A. J. COOK.